United States Patent
Wang et al.

(10) Patent No.: US 11,648,760 B2
(45) Date of Patent: *May 16, 2023

(54) BIAXIALLY-ORIENTED POLYETHYLENE MULTILAYER FILM WITH A MATTE SURFACE

(71) Applicant: Dow Global Technologies LLC, Midland, MI (US)

(72) Inventors: Gang Wang, Shanghai (CN); Xiaobing Yun, Shanghai (CN); Jianping Pan, Shanghai (CN); Jingyi Xu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,602

(22) Filed: Jun. 2, 2022

(65) Prior Publication Data

US 2022/0288908 A1 Sep. 15, 2022

Related U.S. Application Data

(62) Division of application No. 17/252,955, filed as application No. PCT/CN2019/087334 on May 17, 2019, now Pat. No. 11,376,830.

(30) Foreign Application Priority Data

May 17, 2019 (WO) ................ PCT/CN2019/087334

(51) Int. Cl.
| | |
|---|---|
| B32B 27/32 | (2006.01) |
| B32B 7/03 | (2019.01) |
| B32B 27/08 | (2006.01) |
| B32B 27/30 | (2006.01) |
| B32B 27/18 | (2006.01) |
| B32B 1/00 | (2006.01) |

(52) U.S. Cl.
CPC ............... *B32B 27/32* (2013.01); *B32B 7/03* (2019.01); *B32B 27/08* (2013.01); *B32B 2250/02* (2013.01); *B32B 2250/03* (2013.01); *B32B 2250/04* (2013.01); *B32B 2250/05* (2013.01); *B32B 2250/242* (2013.01); *B32B 2307/408* (2013.01); *B32B 2307/518* (2013.01); *B32B 2439/70* (2013.01)

(58) Field of Classification Search
None
See application file for complete search history.

(56) References Cited

U.S. PATENT DOCUMENTS

| | | | |
|---|---|---|---|
| 5,501,905 A | 3/1996 | Krallmann et al. | |
| 5,677,383 A | 10/1997 | Chum et al. | |
| 5,985,426 A | 11/1999 | Wilkie | |
| 6,022,612 A | 2/2000 | Wilkie | |
| 6,111,023 A | 8/2000 | Chum et al. | |
| 6,165,700 A | 12/2000 | Camp et al. | |
| 6,322,894 B1 | 11/2001 | Harley et al. | |
| 6,534,153 B1 | 3/2003 | Chu et al. | |
| 6,984,695 B2 | 1/2006 | Brown et al. | |
| 9,745,455 B2 | 8/2017 | Paulino et al. | |
| 11,376,830 B2 * | 7/2022 | Wang ........................ | B32B 1/00 |
| 2002/0182391 A1 | 12/2002 | Migliorini et al. | |
| 2004/0048084 A1 | 3/2004 | Rhee et al. | |
| 2013/0212983 A1 | 8/2013 | Bender et al. | |
| 2021/0170726 A1 | 6/2021 | D'Agosto et al. | |

FOREIGN PATENT DOCUMENTS

| | | |
|---|---|---|
| CN | 1491866 A | 4/2004 |
| CN | 104149445 A | 11/2014 |
| WO | 2015/154253 A1 | 10/2015 |
| WO | 2018/048580 A1 | 3/2018 |

OTHER PUBLICATIONS

Polyolefins (Polyalkenes), Polymer Properties Database (Year: 2022).*

* cited by examiner

*Primary Examiner* — Ramsey Zacharia
(74) *Attorney, Agent, or Firm* — Quarles & Brady LLP

(57) ABSTRACT

A biaxially-oriented polyethylene (BOPE) multilayer film comprises a skin layer with a matte surface and a core, the skin layer with a matte surface comprising, in weight percent (wt %) based upon the weight of the skin layer: (1) from 20 to 80 wt % of an ethylene-based polymer, and (2) from 80 to 20 wt % of a propylene-based polymer; each of the ethylene-based polymer and the propylene-based polymer having a storage modulus, with a difference between the storage modulus of the ethylene-based polymer and the propylene-based polymer of greater than 40 megaPascals (MPa) at 110° C., and greater than 18 MPa at 120° C.

19 Claims, No Drawings

BIAXIALLY-ORIENTED POLYETHYLENE MULTILAYER FILM WITH A MATTE SURFACE

FIELD

The present disclosure relates to biaxially-oriented polyethylene (BOPE) multilayer films in general, and such films with a matte surface in particular.

BACKGROUND

In recent years, biaxially-oriented polyethylene (BOPE) multilayer film has become more and more welcomed by the packaging industry due to its outstanding mechanical properties which are due, in turn, to the high orientation in both the machine and cross direction of the polymer matrix. Polyethylene (PE) resins can be used in the structural or base layers (non-surface layers) to achieve a PE-rich film structure. When PE is also used in the surface or skin layers, and it typically imparts a smooth, glossy surface(s) to the film. However, in some applications, a matte surface may be desired. Thus, it would be desirable to have a BOPE film with a matte surface.

SUMMARY

The present disclosure provides a biaxially-oriented polyethylene multilayer film. The biaxially-oriented polyethylene multilayer film includes a skin layer with a matte surface and a core, the core including one or more layers, the film characterized by the following:
- (A) the skin layer with a matte surface containing, in weight percent (wt %) based upon the weight of the skin layer:
  - (1) from 20 to 80 wt % of an ethylene-based polymer, and
  - (2) from 80 to 20 wt % of a propylene-based polymer;
  each of the ethylene-based polymer and the propylene-based polymer having a storage modulus, with a difference between the storage modulus of the ethylene-based polymer and the propylene-based polymer of greater than (>) 40 megaPascals (MPa) at 110° C. and >18 MPa at 120° C.;
- (B) the matte surface of the skin layer has a gloss of less than 50% as measured by ASTM D2457 at an angle of 45°;
- (C) the core containing at least 50 wt % of an ethylene-based polymer based on the weight of all of the core layers;
- (D) the film having a thickness, and the core containing at least 50% of the film thickness; and
- (E) the film is oriented in the machine direction at a draw ratio from 2:1 to 6:1, and in the cross direction from 2:1 to 11:1.

The present disclosure also provides a package containing the biaxially-oriented polyethylene multilayer film.

Definitions

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, or 3 to 20 carbon atoms, or 4 to 10 carbon atoms, or 4 to 8 carbon atoms. Nonlimiting examples of α-olefins include ethylene, propylene, 1-butene, 1-pentene, 1-hexene, 1-octene, 1-dodecene, and mixtures of two or more of these monomers.

"Biaxially-oriented polyethylene multilayer film," or "BOPE multilayer film," and like terms refer to a film that (1) comprises one or two skin layers, and one or more core layers, (2) comprises 50% or more by weight of ethylene-based polymer (based on the total polymer weight of the film), and (3) has been subjected to a strain in both the machine direction and the cross direction.

"Blend," "polymer blend," and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Core layer," "base layer." and like terms refer to a non-skin layer of a multilayer film. Typically a core layer is an internal layer, i.e., a layer positioned between two skin layers, of a multilayer film. Neither surface of a core layer is an outermost surface of the multilayer film. In one embodiment, a core layer is the non-skin layer of a two-layer film that comprises a single skin layer. The totality of core layers in the BOPE multilayer film, i.e., one or a plurality, constitute the "core" of the film.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE), medium density polyethylene (MDPE), and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"Film" and like terms refer to any thin, flat extruded or cast thermoplastic article having a generally consistent and uniform thickness. A film can comprise one or more layers.

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

A "hydrocarbon" is a compound that contains only hydrogen and carbon atoms. The hydrocarbon can be (i) branched or unbranched, (ii) saturated or unsaturated, (iii) cyclic or acyclic, and (iv) any combination of (i)-(iii). Nonlimiting examples of hydrocarbons include alkanes, alkenes, and alkynes.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Layer" and like terms refer to a single thickness, coating or stratum spread out or covering a surface.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, or $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Matte surface" and like terms refer to a surface with a dull appearance, as opposed to a glossy appearance. A matte surface has one or both of (1) a gloss of less than 50%, and (2) a haze of greater than 50%.

"Medium density polyethylene" (or "MDPE") is an ethylene homopolymer, or an ethylene/α-olefin copolymer comprising at least one $C_3$-$C_{10}$ α-olefin, or a $C_3$-$C_4$α-olefin, that has a density from 0.926 g/cc to 0.940 g/cc.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

"Multilayerfilm" and like terms refer to a film comprising more than one layer. In one embodiment a multilayer film can comprise one skin layer and one or more core layers. In one embodiment a multilayer film can comprise two skin layers and no core layers. In one embodiment a multilayer film can comprise two skin layers and one or more core layers.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. A nonlimiting example of a propylene-based polymer (polypropylene) is a propylene/α-olefin copolymer with at least one $C_2$ or $C_4$-$C_{10}$ α-olefin comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Skin layer" and like terms refer to an external layer of a multilayer film. In other words, a skin layer is an outermost layer of a multilayer film structure. Typically, a multilayer film comprises two skin layers which compositionally can be the same or different.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

Test Methods

Density is measured in accordance with ASTM D792, Method B. The result is recorded in grams per cubic centimeter (g/cc)

Gloss is measured in accordance with ASTM D2457 at an angle of 45°. Gloss is measured in percent (%).

Haze is measured in accordance with ASTM D1003. Haze is measured in percent (%).

Melt index (MI) (12) is measured in accordance with ASTM D1238, Condition 190° C./2.16 kilogram (kg) weight, formerly known as "Condition E" and also known as $I_2$, and is reported in grams eluted per 10 minutes (g/10 min).

Melt flow rate (MFR) in g/10 min is measured in accordance with ASTM D1238, Condition 230° C./2.16 kilogram (kg) weight.

Storage Modulus

Sample resins are pressed into tablets (60 mm×60 mm×1 mm) by an injection molding machine (FANUC™, S-2000i100BH, Screw diameter=28 mm). Processing parameters are reported in Table 1.

TABLE 1

| Injection Molding Parameters | |
| --- | --- |
| Mold temperature (° C.) | 38 |
| Temperature profile of barrel (° C.) | 200/200/200/200/170 |
| Injection speed (mm/s) | 26 |
| Injection pressure (MPa) | 200 |
| Transition position(mm) | 6 |
| Injection time (s) | 1.67 |
| Holding time (s) | 10 |
| Holding speed (mm/s) | 10 |
| Holding pressure (MPa) | 20 |
| Metering position/unclenching (mm) | 40/3 |
| Back pressure (MPa) | 5 |
| Cooling time (s) | 15 |
| Cycle time (s) | 45 |

The test is conducted on Instrument RSA-G2, TA Instruments, using the tension rectangle. Method parameters are:
1. oscillation temperature ramp;
2. temperature of 35-180° C. at 3° C. per minute;
3. angular frequency of 6.28 rad/s; and
4. strain of 0.1%.

DETAILED DESCRIPTION

The present disclosure provides a biaxially-oriented polyethylene (BOPE) multilayer film. The BOPE multilayer film includes (i) a skin layer with a matte surface and (ii) a core. The core contains one or more layers, and the core contains at least 50 wt % of an ethylene-based polymer, based on the weight of all of the core layers. The skin layer with a matte surface contains from 20 wt % to 80 wt % of an ethylene-based polymer and from 20 wt % to 80 wt % of a propylene-based polymer, based on the total weight of the skin layer; and each of the ethylene-based polymer and the propylene-based polymer has a storage modulus, with a difference between the storage modulus of the ethylene-based polymer and the propylene-based polymer of greater than 40 megaPascals (MPa) at 110° C. and greater than 18 MPa at 120° C. The matte surface of the skin layer has a gloss of less than 50%. The film has a thickness, and the core is at least 50% of the film thickness. The film is oriented in the machine direction at a draw ratio from 2:1 to 6:1, and in the cross direction at a draw ratio from 2:1 to 11:1.

The BOPE multilayer film contains two layers (i.e., the skin layer and one core layers), or more than three layers. For example, the multilayer film can have two, or three, four, five, six, seven, eight, nine, ten, eleven, or more layers. In an embodiment, the multilayer film contains only two layers, or only three layers, or only four layers, or only five layers.

In an embodiment the BOPE multilayer film contains, consists essentially of, or consists of: (i) two skin layers and (ii) one or more core layers. In another embodiment, the BOPE multilayer film contains, consists essentially of, or consists of: (i) two skin layers and (ii) three core layers.

The BOPE multilayer film is oriented in the machine direction at a draw ratio from 2:1 to 6:1, and in the cross direction at a draw ratio from 2:1 to 11:1. In an embodiment, the BOPE multilayer film is oriented in the machine direction at a draw ratio from 2:1, or 3:1, or 4:1 to 5:1, or 6:1; or from 2:1 to 5:1, or from 4:1 to 6:1, or from 4:1 to 5:1. In an embodiment, the BOPE multilayer film is oriented in the cross direction at a draw ratio from 2:1, or 3:1, or 4:1, or 6:1, or 8:1 to 9:1, or 10:1, or 11:1; or from 2:1 to 10:1, or from 2:1 to 9:1, or from 4:1 to 11:1, or from 6:1 to 11:1, or from 8:1 to 11:1, or from 8:1 to 9:1.

In an embodiment, the BOPE multilayer film has an overall draw ratio (draw ratio in machine direction times the draw ratio in cross direction) of from 8, or 9, or 10, or 20, or 30, or 32 to 36, or 40, or 45, or 50, or 54, or 60, or 66; and the ratio of the draw ratio in the machine direction to the draw ratio in the cross direction is from 1.0:1.0, or 1.0:1.5 to 1.0:2.0, or 1.0:2.5, or 1.0:3.0, or 1.0:1.35, or 1.0:4.0, or 1.0:4.5, or 1.0:5.0, or 1.0:5.5.

In an embodiment, the BOPE multilayer film is oriented in the machine direction at a draw ratio from 3:1 to 5:1 and in the cross direction at a draw ratio from 3:1 to 9:1. In addition, the BOPE multilayer film has an overall draw ratio (draw ratio in machine direction times the draw ratio in cross direction) of from 9 to 45, and the ratio of the draw ratio in the machine direction to the draw ratio in the cross direction is from 1.0:1.5 to 1.0:2.0.

The BOPE multilayer film has a thickness. In an embodiment, the BOPE multilayer film has a thickness from 10 µm, or 20 µm, or 30 am to 50 µm, or 80 µm, or 100 µm, or 200 µm, or 300 µm, or 400 am, or 500 µm, or 750 µm, or 1000 µm, or 1500 µm, or 2000 µm, or 3000 µm. In another embodiment, the BOPE multilayer film has a thickness from 10 µm to 3000 µm, or from 10 am to 100 µm, or from 10 am to 1000 µm, or from 500 am to 1500 µm.

The core is at least 50% of the film thickness. In an embodiment, the total thickness of the core (containing one or more layers) is from 50%, or 60%, or 70%, or 80%, or 90% to 95%, or 98% of the total thickness of the BOPE multilayer film. In another embodiment, the total thickness of the core (containing one or more layers) is from 50% to 98%, or from 60% to 95%, or from 70% to 95%, or from 80% to 95%, or from 90% to 95%, or from 70% to 90% of the total thickness of the BOPE multilayer film.

In an embodiment, the skin layer with a matte surface is from 1%, or 2%, or 5% to 10%, or 20%, or 30%, or 40%, or 50% of the total thickness of the BOPE multilayer film. In another embodiment, the skin layer with a matte surface is from 1% to 50%, or from 2% to 50%, or from 5% to 40%, or from 5% to 30%, or from 5% to 20%, or from 5% to 10%, or from 10% to 30%, of the total thickness of the BOPE multilayer film.

Skin Layer

The BOPE multilayer film includes (i) a skin layer with a matte surface and (ii) a core. The skin layer with a matte surface contains from 20 wt % to 80 wt % of an ethylene-based polymer and from 20 wt % to 80 wt % of a propylene-based polymer, based on the total weight of the skin layer; and each of the ethylene-based polymer and the propylene-based polymer has a storage modulus, with a difference between the storage modulus of the ethylene-based polymer and the propylene-based polymer of greater than 40 megaPascals (MPa) at 110° C. and greater than 18 MPa at 120° C. The matte surface of the skin layer has a gloss of less than 50%.

The BOPE multilayer film includes at least one skin layer. In an embodiment, the BOPE multilayer film contains one and only one skin layer. In another embodiment, the BOPE multilayer film contains two skin layers.

The skin layer has two opposing surfaces. In an embodiment, the skin layer is a continuous layer with two opposing surfaces.

At least one surface of the skin layer is a matte surface having a gloss of less than 50%. In an embodiment, each surface of the skin layer is a matte surface having a gloss of less than 50%. The matte surface is an outermost surface of the multilayer film.

The BOPE multilayer film contains at least one skin layer with a matte surface having a gloss of less than (<) 50%, or less than 40%, or less than 20%. In an embodiment, the BOPE multilayer film includes at least one skin layer with a matte surface having a gloss from 0%, or 1%, or 2%, or 3%, or 4% to 10%, or 15%, or 18%, or 19%, or 20%, or 30%, or 40%, or less than 50%; or from 0% to less than 50%, or from 1% to 30%, or from 1% to 20%, or from 4% to 19%.

In an embodiment, the BOPE multilayer film has two skin layers of which one skin layer has a matte surface with a gloss of less than 50%, or less than 40%, or less than 20%. In another embodiment, the BOPE multilayer film has two skin layers of which both skin layers have a matte surface with a gloss of less than 50%, or less than 40%, or less than 20%.

In an embodiment, the BOPE multilayer film contains at least one skin layer with a matte surface having a haze of greater than 50%, or greater than 70%, or greater than 80%. In another embodiment, the BOPE multilayer film contains at least one skin layer with a matte surface having a haze from greater than 50%, or 51%, or 60%, or 70%, or 80% to 88%, or 90%, or 95%, or 100%; or from greater than 50% to 100%, or from 51% to 100%, or from 51% to 90%.

In an embodiment, the BOPE multilayer film has two skin layers of which one skin layer has a matte surface with a haze of greater than 50%, or greater than 70%, or greater than 80%. In another embodiment, the BOPE multilayer film has two skin layers of which both skin layers have a matte surface with a haze of greater than 50%, or greater than 70%, or greater than 80%.

In an embodiment, the skin layer with a matte surface has a thickness from 1 µm, or 2 µm, or 5 µm, or 8 µm, or 10 µm to 15 µm, or 20 am, or 50 µm, or 100 µm, or 200 µm, or 500 µm, or 750 µm, or 1000 µm, or 1500 µm. In another embodiment, the skin layer with a matte surface has a thickness from 1 µm to 1500 µm, or from 1 µm to 100 µm, or from 1 µm to 50 µm, or from 1 µm to 20 µm, or from 5 µm to 10 µm.

Ethylene-Based Polymer

The skin layer with a matte surface contains (i) from 20 wt % to 80 wt % of an ethylene-based polymer; and (ii) from 20 wt % to 80 wt % of a propylene-based polymer, based on the total weight of the skin layer.

Nonlimiting examples of suitable ethylene-based polymer include Ziegler-Natta catalyzed linear low density polyethylene, single site catalyzed (including metallocene) linear low density polyethylene, and medium density polyethylene (MDPE), high density polyethylene (HDPE), and low density polyethylene (LDPE), as well as combinations of two or more of the foregoing. Exemplary commercially available ethylene-based polymers include low density polyethylene (LDPE, e.g., LDPE having a density from 0.917 to 0.924 g/cc and a melt index (I2) of from 0.2 to 75 g/10 min available from The Dow Chemical Company), linear low density polyethylene (LLDPE, e.g., DOWLEX™ made by The Dow Chemical Company with a typical density between about 0.915 and 0.940 g/cc and a typical I2 between about 0.5 and 30 g/10 min), homogeneously branched, linear ethylene/alpha-olefin copolymers (e.g., TAFMER™ polymers by Mitsui Chemicals America, Inc. and EXACT™ polymers by ExxonMobil Chemical (ExxonMobil)), homogeneously branched, substantially linear ethylene/alpha-olefin polymers (e.g., AFFINITY™ and ENGAGE™ polymers commercially available from The Dow Chemical Company olefin block copolymers (e.g., INFUSE™ which are commercially available from The Dow Chemical Company, and high pressure, free radical polymerized ethylene copolymers such as ethylene/vinyl acetate (EVA) and ethylene/acrylate and ethylene/methacrylate polymers (e.g., ELVAX™ and ELVALOY™ polymers, respectively, commercially available from E. I. Du Pont du Nemours & Co. (Du Pont)) and ethylene/acrylic (EAA) and ethylene/methacrylic acid (EMAA) polymers (e.g., PRIMACOR™ EAA polymers commercially available from SK Global Chemical and NUCREL™ EMAA polymers commercially available from Du Pont). Nonlimiting examples of suitable ethylene-based polymer also include ethylene/α-olefin interpolymer and ethylene/α-olefin copolymer. Nonlimiting examples of suitable α-olefins include $C_3$-$C_{20}$ α-olefins, or $C_4$-$C_{20}$ α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene.

In an embodiment, the ethylene-based polymer is a LLDPE.

In an embodiment, the ethylene-based polymer is an ethylene/α-olefin copolymer. The ethylene/α-olefin copolymer contains, consists essentially of, or consists of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer.

In an embodiment, the ethylene-based polymer is an ethylene/octene copolymer. The ethylene/octene copolymer contains, consists essentially of, or consists of (i) ethylene and (ii) octene comonomer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

In an embodiment, the ethylene-based polymer has a density from 0.870 g/cc, or 0.885 g/cc, or 0.900 g/cc, or 0.905 g/cc, or 0.910 g/cc to 0.926 g/cc, or 0.930 g/cc, or 0.940 g/cc, or 0.950 g/cc, or 0.960 g/cc. In another embodiment, the ethylene-based polymer has a density from 0.870 g/cc to 0.960 g/cc, or from 0.900 g/cc to 0.960 g/cc, or from 0.910 g/cc to 0.930 g/cc.

In an embodiment, the ethylene-based polymer has a melt index ($I_2$) from 0.1 g/10 min, or 1.0 g/10 min to 2.0 g/10 min, or 5.0 g/10 min, or 10 g/10 min, or 15 g/10 min, or 20 g/10 min, or 30 g/10 min, or 40 g/10 min, or 50 g/10 min. In another embodiment, the ethylene-based polymer has a melt index ($I_2$) from 0.1 g/10 min to 50 g/10 min, or from 0.1 g/10 min to 20 g/10 min, or from 1 g/10 min to 15 g/10 min.

In an embodiment, the ethylene-based polymer has a storage modulus at 110° C. from greater than 0 MPa, or 0.01 MPa to 23 MPa, or 25 MPa, or 30 MPa. In another embodiment, the ethylene-based polymer has a storage modulus at 110° C. from greater than 0 MPa to 30 MPa, or from 0.01 MPa to 25 MPa, or from 0.01 MPa to 23 MPa, or from greater than 0 MPa to 5 MPa, or from greater than 0 MPa to 1 MPa.

In an embodiment, the ethylene-based polymer has a storage modulus at 120° C. from greater than 0 MPa, or 0.01 MPa to 8 MPa, or 10 MPa, or 15 MPa, or 20 MPa. In another embodiment, the ethylene-based polymer has a storage modulus at 120° C. from greater than 0 MPa to 20 MPa, or from 0.01 MPa to 15 MPa, or from 0.01 MPa to 10 MPa, or from 0.01 MPa to 8 MPa, or from greater than 0 MPa to 5 MPa, or from greater than 0 MPa to 1 MPa.

In an embodiment, the ethylene-based polymer is an ethylene/α-olefin copolymer containing, consisting essentially of, or consisting of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer. The ethylene/α-olefin copolymer has one, some, or all of the following properties: (a) a density from 0.870 g/cc to 0.960 g/cc, or from 0.900 g/cc to 0.960 g/cc, or from 0.910 g/cc to 0.930 g/cc; and/or (b) a melt index ($I_2$) from 0.1 g/10 min to 50 g/10 min, or from 0.1 g/10 min to 20 g/10 min, or from 1 g/10 min to 15 g/10 min; and/or (c) a storage modulus at 110° C. from greater than 0 MPa to 30 MPa, or from greater than 0 MPa to 10 MPa, or greater than 0 MPa to 5 MPa, or from greater than 0 MPa to 1 MPa; and/or (d) a storage modulus at 120° C. from greater than 0 MPa to 20 MPa, or from greater than 0 MPa to 15 MPa, or from greater than 0 MPa to 10 MPa, or from greater than 0 MPa to 5 MPa, or from greater than 0 MPa to 1 MPa.

In an embodiment, the ethylene-based polymer is an ethylene/α-olefin copolymer containing, consisting essentially of, or consisting of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer. The ethylene/α-olefin copolymer has one, some, or all, of the following properties: (a) a density from 0.870 g/cc to 0.960 g/cc, or from 0.900 g/cc to 0.960 g/cc, or from 0.910 g/cc to 0.930 g/cc, or from 0.910 g/cc to 0.915 g/cc; and/or (b) a melt index ($I_2$) from 0.1 g/10 min to 50 g/10 min, or from 1 g/10 min to 20 g/10 min, or from 10 g/10 min to 15 g/10 min; and/or (c) a storage modulus at 110° C. from greater than 0 MPa to 30 MPa, or from 0.01 MPa to 25 MPa, or from 10 MPa to 25 MPa, or from 20 MPa to 23 MPa; and/or (d) a storage modulus at 120° C. from greater than 0 MPa to 20 MPa, or from 0.01 MPa to 15 MPa, or from 5 MPa to 10 MPa, or from 6 MPa to 8 MPa.

In an embodiment, ethylene-based polymer is a LLDPE that is an ethylene/α-olefin copolymer containing, consisting essentially of, or consisting of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer. The LLDPE has one, some, or all, of the following properties: (a) a density from 0.870 g/cc to 0.960 g/cc, or from 0.915 g/cc to 0.940 g/cc, or from 0.920 g/cc to 0.930 g/cc, or from 0.925 g/cc to 0.930 g/cc; and/or (b) a melt index ($I_2$) from 0.1 g/10 min to 30 g/10 min, or from 0.1 g/10 min to 10 g/10 min, or from 0.1 g/10 min to 2 g/10 min; and/or (c) a storage modulus at 110° C. from greater than 0 MPa to 30 MPa, or from 0.01 MPa to 25 MPa, or from 10 MPa to 25 MPa, or from 20 MPa to 23 MPa; and/or (d) a storage modulus at 120° C. from greater than 0 MPa to 20 MPa, or from 0.01 MPa to 15 MPa, or from 5 MPa to 10 MPa, or from 6 MPa to 8 MPa.

The skin layer with a matte surface may contain more than one ethylene-based polymer. In an embodiment, the skin layer with a matte surface includes at least two ethylene-based polymers, wherein each ethylene-based polymer differs from one another compositionally, structurally, and/or physically. For example, the skin layer with a matte surface may contain an LLDPE and a LDPE.

The ethylene-based polymer may comprise two or more embodiments disclosed herein.

Propylene-Based Polymer

The skin layer with a matte surface contains (i) from 20 wt % to 80 wt % of the ethylene-based polymer; and (ii) from 20 wt % to 80 wt % of a propylene-based polymer, based on the total weight of the skin layer.

Nonlimiting examples of suitable propylene-based polymers include ethylene/propylene copolymers, butylene/propylene copolymers, propylene-ethylene-butylene terpolymers and polypropylene homopolymers, as well as combinations of two or more of the foregoing. Exemplary commercially available propylene-based polymers include TOPILENE™ PPR R200P from Hyosung Corporation, TF451 from Hanwha Total, BOREALIS™ PP RD208CF, and VERSIFY™ from The Dow Chemical Company.

In an embodiment, the propylene-based polymer is selected from propylene/α-olefin random copolymer, propylene/ethylene/butylene terpolymer, and combinations thereof.

In an embodiment, the propylene-based polymer is a propylene/α-olefin copolymer. The propylene/α-olefin copolymer contains, consists essentially of, or consists of: (i) propylene and (ii) $C_2$, or $C_4$-$C_{20}$, or $C_4$-$C_{10}$, or $C_4$-$C_8$ α-olefin comonomer.

In an embodiment, the propylene-based polymer is a propylene-ethylene-butylene terpolymer containing, consisting essentially of, or consisting of: (i) propylene, (ii) ethylene comonomer, and (iii) butylene comonomer.

In an embodiment, the propylene-based polymer contains greater than 50 wt % units derived from propylene, or from 51 wt %, or 55 wt %, or 60 wt % to 70 wt %, or 80 wt %, or 90 wt %, or 95 wt %, or 99 wt %, or 100 wt % units derived from propylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the propylene-based polymer.

In an embodiment, the propylene-based polymer has a density from 0.895 g/cc, or 0.900 g/cc to 0.910 g/cc, or 0.915 g/cc, or 0.920 g/cc, or 0.930 g/cc, or 0.940 g/cc, or 0.950 g/cc. In another embodiment, the propylene-based polymer has a density from 0.895 g/cc to 0.950 g/cc, or from 0.895 g/cc to 0.920 g/cc, or from 0.895 g/cc to 0.915 g/cc, or from 0.900 g/cc to 0.910 g/cc.

In an embodiment, the propylene-based polymer has a melt flow rate from 0.01 g/10 min, or 0.10 g/10 min, or 0.20 g/10 min to 7 g/10 min, or 10 g/10 min, or 15 g/10 min, or 20 g/10 min, or 30 g/10 min. In another embodiment, the propylene-based polymer has a melt flow rate from 0.01 g/10 min to 30 g/10 min, or from 0.01 g/10 min to 15 g/10 min, or from 0.10 g/10 min to 10 g/10 min.

In an embodiment, the propylene-based polymer has a storage modulus at 110° C. from greater than 40 MPa, or 45 MPa, or 49 MPa, or 50 MPa, or 70 MPa, or 80 MPa, or 100 MPa, or 120 MPa to 125 MPa, or 130 MPa, or 140 MPa, or 150 MPa. In another embodiment, the propylene-based polymer has a storage modulus at 110° C. from greater than 40 MPa to 150 MPa, or from 45 MPa to 140 MPa, or from 45 MPa to 130 MPa.

In an embodiment, the propylene-based polymer has a storage modulus at 120° C. from greater than 18 MPa, or 19 MPa, or 20 MPa, or 40 MPa, or 50 MPa, or 70 MPa, or 75 MPa to 80 MPa, or 90 MPa, or 100 MPa, or 120 MPa. In another embodiment, the propylene-based polymer has a storage modulus at 120° C. from greater than 18 MPa to 120 MPa, or from 19 MPa to 100 MPa, or from 19 MPa to 80 MPa.

In an embodiment, the propylene-based polymer has one, some, or all of the following properties: (i) a density from 0.895 g/cc to 0.950 g/cc, or from 0.895 g/cc to 0.920 g/cc, or from 0.895 g/cc to 0.915 g/cc, or from 0.900 g/cc to 0.910 g/cc; and/or (ii) a melt flow rate from 0.01 g/10 min to 30 g/10 min, or from 0.01 g/10 min to 15 g/10 min, or from 0.10 g/10 min to 10 g/10 min; and/or (iii) a storage modulus at 110° C. from greater than 40 MPa to 150 MPa, or from 45 MPa to 140 MPa, or from 45 MPa to 130 MPa; and/or (iv) a storage modulus at 120° C. from greater than 18 MPa to 120 MPa, or from 19 MPa to 100 MPa, or from 19 MPa to 80 MPa.

In an embodiment, the propylene-based polymer is a propylene/α-olefin random copolymer containing, consisting essentially of, or consisting of: (i) propylene and (ii) $C_2$, or $C_4$-$C_{20}$, or $C_4$-$C_{10}$, or $C_4$-$C_8$ α-olefin comonomer. The propylene/α-olefin random copolymer has one, some, or all of the following properties: (a) a density from 0.895 g/cc to 0.950 g/cc, or from 0.895 g/cc to 0.920 g/cc, or from 0.895 g/cc to 0.915 g/cc, or from 0.900 g/cc to 0.910 g/cc; and/or (b) a melt flow rate from 0.01 g/10 min to 30 g/10 min, or from 0.01 g/10 min to 15 g/10 min, or from 0.10 g/10 min to 10 g/10 min, or from 0.01 g/10 min to 1.0 g/10 min; and/or (c) a storage modulus at 110° C. from greater than 40 MPa to 150 MPa, or from 45 MPa to 140 MPa, or from 45

MPa to 130 MPa, or from 100 MPa to 150 MPa, or from 120 MPa to 130 MPa; and/or (d) a storage modulus at 120° C. from greater than 18 MPa to 120 MPa, or from 19 MPa to 100 MPa, or from 19 MPa to 80 MPa, or from 50 MPa to 120 MPa, or from 70 MPa to 80 MPa.

In an embodiment, the propylene-based polymer is a propylene-ethylene-butylene terpolymer containing, consisting essentially of, or consisting of: (i) propylene, (ii) ethylene comonomer, and (iii) butylene comonomer. The propylene-ethylene-butylene terpolymer has one, some, or all of the following properties: (a) a density from 0.895 g/cc to 0.950 g/cc, or from 0.895 g/cc to 0.920 g/cc, or from 0.895 g/cc to 0.915 g/cc, or from 0.900 g/cc to 0.910 g/cc; and/or (b) a melt flow rate from 0.01 g/10 min to 30 g/10 min, or from 0.01 g/10 min to 15 g/10 min, or from 1 g/10 min to 10 g/10 min; and/or (c) a storage modulus at 110° C. from greater than 40 MPa to 150 MPa, or from 45 MPa to 100 MPa, or from 45 MPa to 60 MPa; and/or (d) a storage modulus at 120° C. from greater than 18 MPa to 120 MPa, or from 19 MPa to 80 MPa, or from 19 MPa to 30 MPa.

The skin layer with a matte surface may contain more than one propylene-based polymer. In an embodiment, the skin layer with a matte surface includes at least two propylene-based polymers, wherein each propylene-based polymer differs from one another compositionally, structurally, and/or physically. For example, the skin layer with a matte surface may contain a propylene/α-olefin random copolymer and a propylene/ethylene/butylene terpolymer.

The propylene-based polymer may comprise two or more embodiments disclosed herein.

Each of the ethylene-based polymer and the propylene-based polymer has a storage modulus. The difference between the storage modulus of the ethylene-based polymer ($SM_{PE}$) and the storage modulus of the propylene-based polymer ($SM_{PP}$) in the skin layer with a matte surface (the "Δ Storage Modulus") is greater than 40 MPa at 110° C., and greater than 18 MPa at 120° C. The Δ Storage Modulus is calculated in accordance with Equation (A):

$$\Delta \text{Storage Modulus} = |SM_{PE} - SM_{PP}| \quad \text{Equation (A).}$$

In an embodiment, the difference between the storage modulus of the ethylene-based polymer and the storage modulus of the propylene-based polymer (Δ Storage Modulus) at 110° C. is from greater than 40 MPa, or 45 MPa, or 49 MPa, or 50 MPa, or 75 MPa, or 100 MPa to 125 MPa, or 130 MPa, or 140 MPa, or 150 MPa. In another embodiment, the Δ Storage Modulus at 110° C. is from greater than 40 MPa to 150 MPa, or from 45 MPa to 130 MPa, or from 49 MPa to 125 MPa.

In an embodiment, the difference between the storage modulus of the ethylene-based polymer and the storage modulus of the propylene-based polymer (Δ Storage Modulus) at 120° C. is from greater than 18 MPa, or 19 MPa, or 20 MPa, or 40 MPa, or 50 MPa, or 60 MPa, or 70 MPa to 80 MPa, or 85 MPa, or 90 MPa, or 100 MPa, or 110 MPa, or 120 MPa. In another embodiment, the Δ Storage Modulus at 120° C. is from greater than 18 MPa to 120 MPa, or from 19 MPa to 100 MPa, or from 19 MPa to 80 MPa.

In an embodiment, (i) the Δ Storage Modulus at 110° C. is from greater than 40 MPa to 150 MPa, or from 45 MPa to 130 MPa, or from 49 MPa to 125 MPa; and (ii) the Δ Storage Modulus at 120° C. is from greater than 18 MPa to 120 MPa, or from 19 MPa to 100 MPa, or from 19 MPa to 80 MPa.

In an embodiment, the skin layer with a matte surface contains, consists essentially of, or consists of: (i) from 20 wt % to 80 wt %, or from 40 wt % to 60 wt %, or from 50 wt % to 60 wt % of an ethylene-based polymer; and (ii) a reciprocal amount of propylene-based polymer, or from 20 wt % to 80 wt %, or from 40 wt % to 60 wt %, or from 40 wt % to 50 wt % of a propylene-based polymer, based on the total weight of the skin layer.

It is understood that the sum of the components in each of the layers disclosed herein, including the foregoing layers, yields 100 weight percent (wt %), based on the total weight of each respective layer.

In an embodiment, the skin layer with a matte surface contains a single, or one and only one, ethylene-based polymer.

In an embodiment, the ethylene-based polymer is the only polymer containing ethylene monomer in the skin layer with a matte surface.

In an embodiment, the skin layer with a matte surface contains a single, or one and only one, propylene-based polymer.

In an embodiment, the propylene-based polymer is the only polymer containing propylene monomer in the skin layer with a matte surface.

In an embodiment, the ethylene-based polymer and the propylene-based polymer are the only polymeric components in the skin layer.

In an embodiment, the BOPE multilayer film contains at least one, or two, or one and only one, skin layer with a matte surface. The skin layer with a matte surface contains, consists essentially of, or consists of:

(A) from 20 wt % to 80 wt %, or from 40 wt % to 60 wt %, or from 50 wt % to 60 wt % of an ethylene-based polymer that is an ethylene/α-olefin copolymer containing, consisting essentially of, or consisting of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer; the ethylene/α-olefin copolymer having one, some, or all of the following properties: (a) a density from 0.870 g/cc to 0.960 g/cc, or from 0.900 g/cc to 0.960 g/cc, or from 0.910 g/cc to 0.930 g/cc; and/or (b) a melt index ($I_2$) from 0.1 g/10 min to 50 g/10 min, or from 0.1 g/10 min to 20 g/10 min, or from 1 g/10 min to 15 g/10 min; and/or (c) a storage modulus at 110° C. from greater than 0 MPa to 30 MPa, or from greater than 0 MPa to 10 MPa, or from greater than 0 MPa to 5 MPa, or from greater than 0 MPa to 1 MPa; and/or (d) a storage modulus at 120° C. from greater than 0 MPa to 20 MPa, or from greater than 0 MPa to 15 MPa, or from greater than 0 MPa to 10 MPa, or from greater than 0 MPa to 5 MPa, or from greater than 0 MPa to 1 MPa; and (B) from 20 wt % to 80 wt %, or from 40 wt % to 60 wt %, or from 40 wt % to 50 wt % of a propylene-based polymer selected from propylene/α-olefin random copolymer, propylene/ethylene/butylene terpolymer, and combinations thereof, the propylene-based polymer having one, some, or all of the following properties: (i) a density from 0.895 g/cc to 0.950 g/cc, or from 0.895 g/cc to 0.920 g/cc, or from 0.895 g/cc to 0.915 g/cc, or from 0.900 g/cc to 0.910 g/cc; and/or (ii) a melt flow rate from 0.01 g/10 min to 30 g/10 min, or from 0.01 g/10 min to 15 g/10 min, or from 0.10 g/10 min to 10 g/10 min; and/or (iii) a storage modulus at 110° C. from greater than 40 MPa to 150 MPa, or from 45 MPa to 140 MPa, or from 45 MPa to 130 MPa; and/or (iv) a storage modulus at 120° C. from greater than 18 MPa to 120 MPa, or from 19 MPa to 100 MPa, or from 19 MPa to 80 MPa; and the skin layer with a matte surface has one, some, or all of the following properties: (i) a gloss from 0% to less than 50%, or from 1% to 30%, or from 1% to 20%, or from 4% to 19%; and/or (ii) a haze from greater than 50% to 100%, or from 51% to 100%, or from 51% to 90%; and/or (iii) a Δ Storage Modulus at 110° C. from greater than 40 MPa to 150 MPa, or from 45 MPa to 130 MPa, or from 49 MPa to 125 MPa; and/or (iv) a Δ Storage Modulus at 120° C. from greater than 18 MPa to 120 MPa, or from 19 MPa to 100 MPa, or from 19 MPa to 80 MPa; and/or (v) a thickness from 1 μm to 1500 μm, or from 1 μm to 100 μm, or from 1 μm to 50 μm, or from 1 μm to 20 μm, or from 5 μm to 10 μm.

In those embodiments in which the BOPE multilayer film comprises two skin layers, the two skin layers can be the same or different. As long as one skin layer has a matte surface, then the composition of the other skin layer can vary to convenience. Typically, the other skin layer contains at least 50 wt % of one or more ethylene-based polymers.

In an embodiment, the BOPE multilayer film includes (i) a first skin layer with a matte surface and (ii) a second skin layer containing, consisting essentially of, or consisting of an ethylene-based polymer. The ethylene-based polymer in the second skin layer may be the same or different than the ethylene-based polymer in the first skin layer with a matte surface. In an embodiment, the ethylene-based polymer in the second skin layer is different than the ethylene-based polymer in the first skin layer with a matte surface.

In an embodiment, the ethylene-based polymer in the second skin layer is the same as the ethylene-based polymer in the first skin layer with a matter surface. In other words, each ethylene-based polymer has identical comonomer type, comonomer content, structure, and properties.

The skin layer with a matte surface may comprise two or more embodiments disclosed herein.

The skin layer may comprise two or more embodiments disclosed herein.

Core

The BOPE multilayer film includes (i) the skin layer with a matte surface and (ii) a core. The core contains one or more layers. The core contains at least 50 wt % of an ethylene-based polymer, based on the total weight of all of the core layers.

Each core layer has two opposing surfaces. In an embodiment, each core layer is a continuous layer with two opposing surfaces.

The BOPE multilayer film includes a core that contains at least one core layer. In one embodiment, the core of the BOPE multilayer film includes two or more core layers. The core of the BOPE multilayer film contains at least 50 wt %, or 60 wt %, or 70 wt %, or 80 wt %, or 90 wt %, or greater than 99 wt % ethylene-based polymer, e.g., a linear low density polyethylene. The amount of ethylene-based polymer in the core is based on the total weight of the core, and not on the weight of a single layer in the core. As such, in some embodiments, the BOPE multilayer film may contain one or more individual core layers in which the amount of ethylene-based polymer is less than 50 wt %, or is completely absent, based on the weight of the individual core layer, but in these embodiments the amount of ethylene-based polymer in the other layers of the core is sufficient such that the total amount of ethylene-based polymer in the core is at least 50 wt %.

In an embodiment, the core contains from 50 wt %, or 60 wt %, or 70 wt %, or 80 wt %, or 90 wt % to 100 wt % ethylene-based polymer, based on the total weight of all of the core layers. In another embodiment, the core contains from 50 wt % to 100 wt %, or from 70 wt % to 100 wt %, or from 90 wt % to 100 wt % ethylene-based polymer, based on the total weight of all of the core layers.

In an embodiment, the core consists essentially of, or consists of ethylene-based polymer. In other words, the core contains 100 wt % ethylene-based polymer, based on the total weigh of all the core layers.

The ethylene-based polymer may be any ethylene-based polymer disclosed herein. In an embodiment, the ethylene-based polymers of the core layer or core layers are the same as those described for the skin layer with a matte surface. Any thermoplastic polymer compatible with the ethylene-based polymer, and that contributes to the desired properties of the BOPE multilayer film, can be used in combination with the ethylene-based polymer in any given core layer. Typical of such polymers are the propylene-based polymers described for the skin layer with a matte surface.

In an embodiment, the BOPE multilayer film includes a core with from one, or two to three, or four, or five core layers. Each core layer may the same or different. In an embodiment, each core layer is structurally, compositionally, and/or physically the same. In another embodiment, each core layer is structurally, compositionally, and/or physically different.

In an embodiment, the core has a thickness from 5 μm, or 10 μm, or 20 μm, or 30 μm to 40 μm, or 50 μm, or 100 μm, or 200 μm, or 300 μm, or 400 μm, or 500 μm, or 600 μm, or 700 μm, or 800 μm, or 900 μm, or 1000 μm, or 1200 μm, or 1500 μm, or 2000 μm, or 2500 μm, or 2900 μm, or less than 3000 μm. In another embodiment, the core has a thickness from 5 μm to less than 3000 μm, or from 5 μm to less than 1000 μm, or from 50 μm to less than 3000 μm, or from 500 am to 2000 μm, or from 500 μm to 1000 μm, or from 10 μm to 90 μm, or from 20 μm to 80 μm.

In an embodiment, the BOPE multilayer film includes a core with from one, or two to three, or four, or five core layers. Each core layer contains, consists essentially of, or consists of an ethylene-based polymer that is an ethylene/α-olefin copolymer containing, consisting essentially of, or consisting of: (i) ethylene and (ii) $C_3$-$C_{20}$, or $C_4$-$C_{20}$, or $C_3$-$C_{10}$, or $C_4$-$C_{10}$, or $C_4$-$C_8$, or $C_8$ α-olefin comonomer. The ethylene/α-olefin copolymer has one, some, or all of the following properties: (a) a density from 0.870 g/cc to 0.960 g/cc, or from 0.900 g/cc to 0.960 g/cc, or from 0.910 g/cc to 0.930 g/cc; and/or (b) a melt index ($I_2$) from 0.1 g/10 min to 50 g/10 min, or from 0.1 g/10 min to 20 g/10 min, or from 1 g/10 min to 15 g/10 min; and/or (c) a storage modulus at 110° C. from greater than 0 MPa to 30 MPa, or from greater than 0 MPa to 10 MPa, or from greater than 0 MPa to 5 MPa, or from greater than 0 MPa to 1 MPa; and/or (d) a storage modulus at 120° C. from greater than 0 MPa to 20 MPa, or from greater than 0 MPa to 15 MPa, or from greater than 0 MPa to 10 MPa, or from greater than 0 MPa to 5 MPa, or from greater than 0 MPa to 1 MPa. The core contains from 50 wt % to 100 wt %, or from 70 wt % to 100 wt %, or from 90 wt % to 100 wt %, or 100 wt % ethylene-based polymer, based on the total weigh of all the core layers. The core has a thickness from 5 μm to less than 3000 μm, or from 5 μm to less than 1000 μm, or from 50 μm to less than 3000 μm, or from 500 μm to 2000 μm, or from 500 μm to 1000 μm, or from 10 μm to 90 μm, or from 20 μm to 80 μm.

In an embodiment, the core contains a single, or one and only one, ethylene-based polymer.

In an embodiment, the ethylene-based polymer is the only polymer containing ethylene monomer in the core.

In an embodiment, the ethylene-based polymer of the core is the same or different than the ethylene-based polymer of the skin layer. In an embodiment, the ethylene-based polymer of the core is different than the ethylene-based polymer of the skin layer.

In an embodiment, the ethylene-based polymer of the core is the same as the ethylene-based polymer of the skin layer.

In other words, the ethylene-based polymer of the core and the ethylene-based polymer of the skin layer each has identical comonomer type, comonomer content, structure, and properties.

In one embodiment the overall content of ethylene-based polymer in the BOPE multilayer film is at least 50 wt %, or 60 wt %, or 70 wt %, or 80 wt %, or 90 wt % or more. However, the weight percent of ethylene-based polymer in the core of the BOPE multilayer film may exceed the weight percent of ethylene-based polymer in the BOPE multilayer film itself due to the presence of propylene-based polymer in the skin layer(s).

The core may comprise two or more embodiments disclosed herein.

Additives

In an embodiment, the BOPE multilayer film contains (i) the skin layer containing ethylene-based polymer and propylene-based polymer, and (ii) the core containing ethylene-based polymer, and one or both of the skin layer and the core contains one or more additives.

The additives are used in known amounts and in known ways, and include, without limitation, antioxidants, ultraviolet light stabilizers, thermal stabilizers, slip agents, antiblock agents, pigments or colorants, processing aids, crosslinking catalysts, flame retardants, fillers and foaming agents. The additives can be included in one or more of the skin and core layers.

In an embodiment, the BOPE multilayer film is void of, or substantially void of, metal oxide (such as titanium dioxide).

In an embodiment, the BOPE multilayer film is void of, or substantially void of, silicon dioxide.

In an embodiment, the overall content of ethylene-based polymer in the BOPE multilayer film is from 50 wt %, or 60 wt %, or 70 wt %, or 80 wt %, or 90 wt % to 95 wt %, or 98 wt %, or 99 wt %, based on the total weight of the BOPE multilayer film. In another embodiment, the overall content of ethylene-based polymer in the BOPE multilayer film is from 50 wt % to 99 wt %, or from 60 wt % to 98 wt %, or from 80 wt % to 98 wt %, based on the total weight of the BOPE multilayer film.

The core is in contact with the skin layer with a matte surface. The core layer may be in direct contact or in indirect contact with the skin layer with a matte surface. In an embodiment, the core directly contacts the skin layer with a matte surface. The term "directly contacts," as used herein, is a layer configuration whereby the core is located immediately adjacent to the skin layer with a matte surface and no intervening layers, or no intervening structures, are present between the core and the skin layer with a matte surface.

In another embodiment, the core indirectly contacts the skin layer with a matte surface and no intervening layers. The term "indirectly contacts," as used herein, is a layer configuration whereby an intervening layer, or an intervening structure, is present between the core and the skin layer with a matte surface and no intervening layers.

In an embodiment, the BOPE multilayer film contains, consists essentially of, or consists of:

(A) from one to two, or one and only one, skin layer with a matte surface, the skin layer with a matte surface containing, consisting essentially of, or consisting of:

(i) from 20 wt % to 80 wt %, or from 40 wt % to 60 wt %, or from 50 wt % to 60 wt % of a first ethylene-based polymer that is a first ethylene/α-olefin copolymer containing, consisting essentially of, or consisting of ethylene and $C_3$-$C_{20}$, or $C_4$-$C_{20}$, or $C_3$-$C_{10}$, or $C_4$-$C_{10}$, or $C_4$-$C_8$, or $C_8$ α-olefin comonomer; the first ethylene/ α-olefin copolymer having one, some, or all of the following properties: (a) a density from 0.870 g/cc to 0.960 g/cc, or from 0.900 g/cc to 0.960 g/cc, or from 0.910 g/cc to 0.930 g/cc; and/or (b) a melt index ($I_2$) from 0.1 g/10 min to 50 g/10 min, or from 0.1 g/10 min to 20 g/10 min, or from 1 g/10 min to 15 g/10 min; and/or (c) a storage modulus at 110° C. from greater than 0 MPa to 30 MPa, or from greater than 0 MPa to 10 MPa, or from greater than 0 MPa to 5 MPa, or from greater than 0 MPa to 1 MPa; and/or (d) a storage modulus at 120° C. from greater than 0 MPa to 20 MPa, or from greater than 0 MPa to 15 MPa, or from greater than 0 MPa to 10 MPa, or from greater than 0 MPa to 5 MPa, or from greater than 0 MPa to 1 MPa; and (ii) from 20 wt % to 80 wt %, or from 40 wt % to 60 wt %, or from 40 wt % to 50 wt % of a propylene-based polymer selected from propylene/α-olefin random copolymer, propylene/ethylene/butylene terpolymer, and combinations thereof, the propylene-based polymer having one, some, or all of the following properties: (i) a density from 0.895 g/cc to 0.950 g/cc, or from 0.895 g/cc to 0.920 g/cc, or from 0.895 g/cc to 0.915 g/cc, or from 0.900 g/cc to 0.910 g/cc; and/or (ii) a melt flow rate from 0.01 g/10 min to 30 g/10 min, or from 0.01 g/10 min to 15 g/10 min, or from 0.10 g/10 min to 10 g/10 min; and/or (iii) a storage modulus at 110° C. from greater than 40 MPa to 150 MPa, or from 45 MPa to 140 MPa, or from 45 MPa to 130 MPa; and/or (iv) a storage modulus at 120° C. from greater than 18 MPa to 120 MPa, or from 19 MPa to 100 MPa, or from 19 MPa to 80 MPa;

(B) a core containing from one, or two to three, or four, or five core layers, wherein each core layer contains, consists essentially of, or consists of a second ethylene-based polymer that is a second ethylene/α-olefin copolymer containing, consisting essentially of, or consisting of ethylene and $C_3$-$C_{20}$, or $C_4$-$C_{20}$, or $C_3$-$C_{10}$, or $C_4$-$C_{10}$, or $C_4$-$C_8$, or $C_8$ α-olefin comonomer, the second ethylene/α-olefin copolymer has one, some, or all of the following properties: (a) a density from 0.870 g/cc to 0.960 g/cc, or from 0.900 g/cc to 0.960 g/cc, or from 0.910 g/cc to 0.930 g/cc; and/or (b) a melt index ($I_2$) from 0.1 g/10 min to 50 g/10 min, or from 0.1 g/10 min to 20 g/10 min, or from 1 g/10 min to 15 g/10 min; and/or (c) a storage modulus at 110° C. from greater than 0 MPa to 30 MPa, or from greater than 0 MPa to 10 MPa, or from greater than 0 MPa to 5 MPa, or from greater than 0 MPa to 1 MPa; and/or (d) a storage modulus at 120° C. from greater than 0 MPa to 20 MPa, or from greater than 0 MPa to 15 MPa, or from greater than 0 MPa to 10 MPa, or from greater than 0 MPa to 5 MPa, or from greater than 0 MPa to 1 MPa; and the skin layer with a matte surface has (i) a Δ Storage Modulus at 110° C. from greater than 40 MPa to 150 MPa, or from 45 MPa to 130 MPa, or from 49 MPa to 125 MPa; and (ii) a Δ Storage Modulus at 120° C. from greater than 18 MPa to 120 MPa, or from 19 MPa to 100 MPa, or from 19 MPa to 80 MPa;

the skin layer with a matte surface has a gloss from 0% to less than 50%, or from 1% to 30%, or from 1% to 20%, or from 4% to 19%;

the core contains from 50 wt % to 100 wt %, or from 70 wt % to 100 wt %, or from 90 wt % to 100 wt %, or 100 wt % ethylene-based polymer, based on the total weigh of all the core layers;

the total thickness of the core (containing one or more layers) is from 50% to 98%, or from 60% to 95%, or from 70% to 95%, or from 80% to 95%, or from 90% to 95%, or from 70% to 90% of the total thickness of the BOPE multilayer film;

the BOPE multilayer film is oriented in the machine direction at a draw ratio from 2:1 to 6:1, or from 2:1 to 5:1, or from 4:1 to 6:1, or from 4:1 to 5:1;

the BOPE multilayer film is oriented in the cross direction at a draw ratio from 2:1 to 11:1, or from 2:1 to 10:1, or from 2:1 to 9:1, or from 4:1 to 11:1, or from 6:1 to 11:1, or from 8:1 to 11:1, or from 8:1 to 9:1; and the BOPE multilayer film has one, some, or all of the following properties: (i) the skin layer with a matte surface has a gloss from 0% to less than 50%, or from 1% to 30%, or from 1% to 20%, or from 4% to 19%; and/or (ii) the skin layer with a matte surface has a haze from greater than 50% to 100%, or from 51% to 100%, or from 51% to 90%; and/or (iii) the skin layer with a matte surface has a thickness from 1 μm to 1500 μm, or from 1 μm to 100 μm, or from 1 μm to 50 μm, or from 1 μm to 20 μm, or from 5 μm to 10 μm; and/or (v) the BOPE multilayer film has a thickness from 10 μm to 3000 μm, or from 10 μm to 100 μm, or from 10 μm to 1000 μm, or from 500 μm to 1500 μm; and/or (vi) the skin layer with a matte surface is from 1% to 50%, or from 2% to 50%, or from 5% to 40%, or from 5% to 30%, or from 5% to 20%, or from 5% to 10%, or from 10% to 30%, of the total thickness of the BOPE multilayer film; and/or (vii) the BOPE multilayer film has an overall draw ratio (draw ratio in machine direction times the draw ratio in cross direction) from 8 to 66, or from 8 to 54, or from 10 to 50, or from 20 to 40, or from 32 to 36; and/or (viii) the ratio of the draw ratio in the machine direction to the draw ratio in the cross direction is from 1.0:1.0 to 1.0:5.5, or from 1.0:1.0 to 1.0:2.5, or from 1.0:1.5 to 1.0:2.0; and/or (ix) the core directly contacts the skin layer with a matte surface.

The BOPE multilayer film may comprise two or more embodiments disclosed herein.

Applications

The present BOPE multilayer films are well suited for use in packaging of liquids, powders, frozen foods, meat, and the like. Typical package structures in which these films can used include, but are not limited to, standup pouch, pillow pouch, 3-side seal pouch, sachets, and the like.

By way of example, and not limitation, some embodiments of the present disclosure will now be described in detail in the following Examples.

EXAMPLES

The materials used in the inventive and comparative examples are reported in Table 2.

TABLE 2

Materials Used in the Inventive and Comparative Examples

| PE Component | Storage Modulus at 110° C. (MPa) | Storage Modulus at 120° C. (MPa) | Density (g/cc) | Melt Index (g/10 min) |
|---|---|---|---|---|
| PE1 | <0.1 | <0.1 | 0.910 | 15 |
| PE2 | 22.4 | 7.6 | 0.926 | 1.7 |

TABLE 2-continued

Materials Used in the Inventive and Comparative Examples

| PP Component | Storage Modulus at 110° C. (MPa) | Storage Modulus at 120° C. (MPa) | Density (g/cc) | Melt Flow Rate (g/10 min) |
|---|---|---|---|---|
| PP1 | 124.0 | 77.8 | 0.900 | 0.25 |
| PP2 | 49.1 | 19.0 | 0.910 | 7.0 |
| PP3 | 54.2 | 24.9 | 0.900-0.910 | 8.0 |

PE1 is ELITE™ 5815, an enhanced polyethylene (ethylene/octene copolymer), available from The Dow Chemical Company.

PE2 is a linear low density polyethylene (ethylene/octene copolymer). PE2 can generally be prepared as described in the Examples of WO2018/048580 for the polyethylene identified as "$2^{nd}$ PE Comp," the contents of which are herein incorporated by reference.

PP1 is TOPILENE™ PPR R200P, a propylene random copolymer, available from Hyosung Corporation.

PP2 is TF451, a propylene-ethylene-butene terpolymer, available from Hanwha Total.

PP3 is Borealis PP RD208CF, a propylene random copolymer, and available from Borealis AG.

Procedure

Cast samples with 1000 micron (μm) thickness are made on a Dr. Collin cast film line with four extruders (named A, B, C and D). The length/diameter ratio of the extruder screw is 25/1. The screw diameter for A, B and D is 25 millimeters (mm) and for C it is 30 mm. These four extruders make a five layer (A/B/C/B/D) structure. Layers A, B and C use the same materials. The PE Component and the PP Component are blended and extruded by extruder D to provide the skin layer. Layer D is ~10% of the total thickness of the film. In other words, Layer D has a thickness of 100 μm.

The biaxial stretching on cast samples is conducted by an ACCUPULL™ biaxial stretcher. 4× stretching and 8× stretching are applied in the machine direction and cross direction of cast samples, respectively. In other words, each multilayer film is oriented in the machine direction at a draw ratio of 4:1, and in the cross direction at a draw ratio of 8:1. The stretching temperature is from 110° C. to 120° C.

Results

As reported in Table 3, only PE2 is used in skin layer A and core layers B and C of all the samples, both inventive and comparative. Only the formulation of skin layer D is different in the samples. The composition of skin layer A and the core layers B and C is not changed in order to evaluate the surface properties provided by the different skin layer D formulations. It will be appreciated that a variety of resins can be used in skin layer A and the core layers in other embodiments of the present BOPE multilayer film.

By blending the PE Component (selected from different PE grades in Table 2) with the PP Component (selected from the different propylene-based polymers listed in Table 2), the sample films of Examples 1-3 (Ex. 1-3) have a matte surface with a gloss of less than 20% and a haze greater than 50%. In Examples 1-3, the storage modulus of the PP Component is larger than the storage modulus of the PE Component by more than 40 MPa at 110° C., and by more than 18 MPa at 120° C. In contrast, the films of Comparative Samples 1 and 2 have a gloss of greater than 50% and a haze less than 10%.

In those comparative samples, the difference in the storage modulus of the PE Component and the PE Component is less than 40 MPa at 110° C., and less than 18 MPA at 120° C.

In Table 3, "CS" refers to a comparative sample.

TABLE 3

Sample Multilayer Film (A/B/C/B/D) Formulations and Properties

| Sample | Skin Layer A[1] | Core[2] | Skin Layer D[3] | Gloss (%) | Haze (%) | Difference in storage modulus between PE Component and PP Component (MPa) 110° C. | 120° C. |
|---|---|---|---|---|---|---|---|
| Ex. 1 | PE2 | PE2 | 50% PE1 + 50% PP1 | 4.8 | 86.5 | 124.0 | 77.8 |
| Ex. 2 | PE2 | PE2 | 60% PE2 + 40% PP1 | 9.8 | 76.8 | 101.6 | 70.2 |
| Ex. 3 | PE2 | PE2 | 60% PE1 + 40% PP2 | 17.0 | 51.9 | 49.1 | 19.0 |
| CS 1 | PE2 | PE2 | 50% PE2 + 50% PP2 | 58.1 | 4.2 | 26.7 | 11.4 |
| CS 2 | PE2 | PE2 | 50% PE2 + 50% PP3 | 65.8 | 9.2 | 31.8 | 17.3 |

[1]Each sample Skin Layer A contains 100 wt % PE2, based on the total weight of the Skin Layer A.
[2]Each sample Core contains three core layers (core layers B, C, and B), and each core layer contains 100 wt % PE2, based on the total weight of the respective core layer. Each sample Core contains 100 wt % PE2, based on the total weight of all of the core layers.
[3]Weight percent of Skin Layer D is based on the total weight of the respective Skin Layer D. For example, Ex. 1 contains 50 wt % PE1 and 50 wt % PP1, based on the total weight of Ex. 1's Skin Layer D.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A biaxially-oriented polyethylene (BOPE) multilayer film comprising a skin layer with a matte surface and a core, the core comprising one or more layers, the film characterized by the following:
   (A) the skin layer with a matte surface comprising, in weight percent (wt %) based upon the weight of the skin layer:
       (1) from 20 to 80 wt % of one or more ethylene-based polymers, each ethylene-based polymer having a density from 0.870 g/cc to 0.930 g/cc, and
       (2) from 80 to 20 wt % of a propylene-based polymer;
   each of the ethylene-based polymer and the propylene-based polymer having a storage modulus, with a difference between the storage modulus of the ethylene-based polymer and the propylene-based polymer of greater than 40 MPa at 110° C., and greater than 18 MPa at 120° C.;
   (B) the matte surface of the skin layer has a gloss of less than 50% as measured by ASTM D2457 at an angle of 45°;
   (C) the core comprising at least 50 wt % of an ethylene-based polymer based on the weight of all of the core layers;
   (D) the film having a thickness, and the core comprising at least 50% of the film thickness; and
   (E) the film is oriented in the machine direction at a draw ratio from 2:1 to 6:1, and in the cross direction from 2:1 to 11:1.

2. The BOPE multilayer film of claim 1 in which the difference between the storage modulus of the ethylene-based polymer and the propylene-based polymer is greater than 50 MPa at 110° C., and greater than 50 MPa at 120° C.

3. The BOPE multilayer film of claim 1 in which the ethylene-based polymer of the skin layer with a matte surface is a linear low density polyethylene (LLDPE).

4. The BOPE multilayer film of claim 1 in which the propylene-based polymer of the skin layer with a matte surface is one or more of a propylene random copolymer and a propylene-ethylene-butene terpolymer.

5. The BOPE multilayer film of claim 1 comprising two skin layers, one of which has a matte surface with a gloss of less than 50%, and the other of which has a gloss of 50% or greater.

6. The BOPE multilayer film of claim 1 in which the matte surface of the skin layer has a haze of greater than 50% as measured by ASTM D1003.

7. The BOPE multilayer film of claim 1 wherein the core comprises a plurality of layers comprising more than one core layer.

8. The BOPE multilayer film of claim 1 wherein the core comprises at least 3 layers comprising at least 3 core layers.

9. The BOPE multilayer film of claim 1 wherein the skin layer with a matte surface directly contacts the core; and
   the core comprises from 50 wt % to 100 wt % of the ethylene-based polymer, based on the weight of all of the core layers.

10. The BOPE multilayer film of claim 1 wherein the skin layer with a matte surface comprises
    an ethylene/$C_4$-$C_8$ α-olefin copolymer;
    a propylene/ethylene copolymer, having a difference in storage modulus from 100 MPa to 130 MPa at 110° C., and from 70 MPa to 80 MPa at 120° C.; and
    the matte surface of the skin layer has (i) a gloss from 3% to 15% and (ii) a haze from 70% to 90%.

11. The BOPE multilayer film of claim 10 wherein the skin layer with a matte surface comprises
    a single ethylene-based polymer that is a single ethylene/$C_4$-$C_8$ α-olefin copolymer; and
    a single propylene-based polymer that is a single propylene/ethylene copolymer.

12. The BOPE multilayer film of claim 1 wherein the skin layer with a matte surface comprises
    an ethylene/$C_4$-$C_8$ α-olefin copolymer;
    a propylene/ethylene/butene terpolymer, having a difference in storage modulus from greater than 40 MPa to 50 MPa, and from greater than 18 MPa to 20 MPa at 120° C.; and
    the matte surface of the skin layer has (i) a gloss from 15% to 19% and (ii) a haze from greater than 50% to 55%.

13. The BOPE multilayer film of claim 12 wherein the skin layer with a matte surface comprises a single ethylene-based polymer that is a single ethylene/$C_4$-$C_8$ α-olefin copolymer; and a single propylene-based polymer that is a single propylene/ethylene/butene terpolymer.

14. The BOPE multilayer film of claim 1 comprising at least two core layers, each core layer composed of the same ethylene-based polymer.

15. The BOPE multilayer film of claim 14 wherein the ethylene-based polymer in the skin layer with a matte surface and the ethylene-based polymer in each core layer is the same ethylene-based polymer.

16. The BOPE multilayer film of claim 1 wherein the one or more ethylene-based polymers in the skin layer with a matte surface consist of one or more ethylene-based polymers having a density from 0.870 g/cc to 0.930 g/cc.

17. The BOPE multilayer film of claim 1 wherein each ethylene-based polymer in the film contains greater than 50 weight percent polymerized ethylene monomer and a comonomer.

18. The BOPE multilayer film of claim 17 wherein each propylene-based polymer in the BOPE film contains greater than 50 weight percent polymerized propylene monomer and at least one comonomer.

19. A package comprising the BOPE multilayer film of claim 1.

* * * * *